US012243488B2

(12) United States Patent
Kim et al.

(10) Patent No.: US 12,243,488 B2
(45) Date of Patent: Mar. 4, 2025

(54) PIXEL AND DISPLAY DEVICE INCLUDING THE SAME

(71) Applicant: SAMSUNG DISPLAY CO., LTD., Yongin-si (KR)

(72) Inventors: Dong Woo Kim, Yongin-si (KR); Kwi Hyun Kim, Yongin-si (KR); Yeon Kyung Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/490,420

(22) Filed: Oct. 19, 2023

(65) Prior Publication Data

US 2024/0212619 A1 Jun. 27, 2024

(30) Foreign Application Priority Data

Dec. 21, 2022 (KR) ........................ 10-2022-0181024

(51) Int. Cl.
*G09G 3/3258* (2016.01)
*G09G 3/32* (2016.01)
(Continued)

(52) U.S. Cl.
CPC ......... *G09G 3/3258* (2013.01); *G09G 3/3233* (2013.01); *G09G 3/3266* (2013.01);
(Continued)

(58) Field of Classification Search
CPC .. G09G 3/3258; G09G 3/3233; G09G 3/3266; G09G 3/3275; G09G 2310/0243;
(Continued)

(56) References Cited

U.S. PATENT DOCUMENTS 6,859,193 B1 * 2/2005 Yumoto ............... G09G 3/3216 345/82
10,204,553 B2 2/2019 Jeong
(Continued)

FOREIGN PATENT DOCUMENTS

CN 110164378 8/2019
CN 114203109 3/2022
(Continued)

*Primary Examiner* — Douglas M Wilson

(74) *Attorney, Agent, or Firm* — F. Chau & Associates, LLC

(57) ABSTRACT

A pixel includes a light emitting element, a first transistor including an electrode connected to a first power source line via a first node, another electrode connected to a second power source line via a second node and the light emitting element, and another electrode connected to a third node. The pixel further includes a second transistor connected between a data line and the second node and having a gate electrode connected to a scan line, a third transistor connected between the first node and the third node and having a gate electrode connected to the scan line, a fourth transistor connected between the first power source line and the first node and having a gate electrode connected to an emission control line, a first capacitor connected between the second node and the third node, and a second capacitor connected between a third power source line and the third node.

18 Claims, 13 Drawing Sheets

(51) Int. Cl.

| | |
|---|---|
| ***G09G 3/3208*** | (2016.01) |
| ***G09G 3/3233*** | (2016.01) |
| ***G09G 3/3266*** | (2016.01) |
| ***G09G 3/3275*** | (2016.01) |

(52) U.S. Cl.

CPC ............. *G09G 3/3275* (2013.01); *G09G 3/32* (2013.01); *G09G 3/3208* (2013.01); *G09G 2300/0426* (2013.01); *G09G 2300/043* (2013.01); *G09G 2300/0842* (2013.01); *G09G 2310/0243* (2013.01); *G09G 2310/08* (2013.01); *G09G 2320/0646* (2013.01); *G09G 2330/021* (2013.01)

(58) Field of Classification Search

CPC ....... G09G 2310/08; G09G 2320/0646; G09G 3/32; G09G 3/3208; G09G 2300/0426; G09G 2300/043; G09G 2300/0842; G09G 2330/021

See application file for complete search history.

(56) References Cited

U.S. PATENT DOCUMENTS

| | | | | |
|---|---|---|---|---|
| 11,263,976 B2 * | 3/2022 | Yang | G09G 3/3266 | |
| 2011/0069058 A1 | 3/2011 | Chung et al. | | |
| 2011/0115764 A1 * | 5/2011 | Chung | G09G 3/3233 | 345/205 |

FOREIGN PATENT DOCUMENTS

| | | |
|---|---|---|
| KR | 10-0570995 | 4/2006 |
| KR | 10-0888004 | 3/2009 |
| KR | 10-0952111 | 4/2010 |
| KR | 10-1058111 | 8/2011 |
| KR | 10-2456297 | 10/2022 |

* cited by examiner

PL3: VL1, VL2, VLn

PIXEL AND DISPLAY DEVICE INCLUDING THE SAME

CROSS-REFERENCE TO RELATED APPLICATION

This application claims priority under 35 U.S.C. § 119 to Korean Patent Application No. 10-2022-0181024, filed on Dec. 21, 2022, the disclosure of which is incorporated by reference herein in its entirety.

TECHNICAL FIELD

Embodiments of the present disclosure relate to a pixel and a display device including the same.

DISCUSSION OF RELATED ART

As advances are made information technology, utilization of a display device, which provides an interface between a user and information, has increased. In response, the use of display devices such as a liquid crystal display device, an organic light emitting display device, and the like has been increasing.

A display device may display a predetermined image using pixels. A pixel includes a driving transistor and a plurality of transistors and capacitors that compensate for a threshold voltage of the driving transistor.

SUMMARY

Embodiments of the present disclosure provide a pixel capable of compensating for a threshold voltage of a driving transistor and applicable to a high resolution, and a display device including the same.

A pixel according to embodiments of the present disclosure includes a light emitting element, a first transistor including a first electrode connected to a first power source line via a first node, a second electrode connected to a second power source line via a second node and the light emitting element, and a gate electrode connected to a third node. The pixel further includes a second transistor connected between a data line and the second node and having a gate electrode connected to a scan line, a third transistor connected between the first node and the third node and having a gate electrode connected to the scan line, a fourth transistor connected between the first power source line and the first node and having a gate electrode connected to an emission control line, a first capacitor connected between the second node and the third node, and a second capacitor connected between a third power source line and the third node.

According to an embodiment, during a first period of one horizontal period, the second, third, and fourth transistors are set to a turned-on state, and during a second period excluding the first period of the one horizontal period, the fourth transistor is set to a turned-off state.

According to an embodiment, the first power source line and the third power source line are electrically connected to each other.

A display device according to embodiments of the present disclosure includes a plurality of pixels connected to a plurality of scan lines, a plurality of data lines, and a plurality of emission control lines, and a power supply unit that supplies a voltage of a first power source to a first power source line, a voltage of a second power source to a second power source line, and a voltage of a reference power source to a third power source line. A pixel among the plurality of pixels positioned on an i-th horizontal line and a j-th vertical line, where i and j are positive integers, includes a light emitting element, a first transistor including a first electrode connected to the first power source line via a first node, a second electrode connected to the second power source line via a second node and the light emitting element, and a gate electrode connected to a third node, a second transistor connected between a j-th data line among the plurality of data lines and the second node and turned on when a scan signal is supplied to an i-th scan line among the plurality of scan lines, a third transistor connected between the first node and the third node and turned on when the scan signal is supplied to the i-th scan line, a fourth transistor connected between the first power source line and the first node and turned off when an emission control signal is supplied to a k-th emission control line, where k is a positive integer, a first capacitor connected between the second node and the third node, and a second capacitor connected between the third power source line and the third node.

According to an embodiment, the power supply unit supplies the reference power source as a constant voltage to the pixels.

According to an embodiment, the first power source line and the third power source line are electrically connected to each other, and the reference power source is set to the same voltage as the first power source.

According to an embodiment, the power supply unit supplies a first voltage as the reference power source to the third power source line when the scan signal is supplied, and supplies a second voltage different from the first voltage as the voltage of the reference power source to the third power source line after supply of the scan signal is stopped.

According to an embodiment, the second voltage is set to a higher voltage value than the first voltage.

According to an embodiment, one frame period is driven by being divided into a scan period in which the pixels do not emit light and an emission period in which the pixels emit light. The power supply unit supplies the reference power source of the first voltage to the third power source line during the scan period and supplies the reference power source of the second voltage to the third power source line during the emission period. The power supply unit supplies the second power source of a high voltage during the scan period and supplies the second power source of a low voltage, relative to the high voltage, during the emission period.

According to an embodiment, the high voltage of the second power source causes the pixels to not emit light, and the low voltage of the second power source causes the pixels to emit light.

According to an embodiment, the third power source line includes a plurality of power source control lines electrically connected to the pixels in units of horizontal lines.

According to an embodiment, the power supply unit sequentially supplies the reference power source of the first voltage to the plurality of power source control lines.

According to an embodiment, the display device further includes a timing controller that controls the power supply unit in response to a dimming value included in a dimming signal supplied from outside of the display device.

According to an embodiment, the power supply unit changes a voltage value of the second voltage in response to an increase in the dimming value.

According to an embodiment, when a maximum display luminance of the display device increases in response to the increase in the dimming value, the voltage value of the second voltage increases in response to the increase in the dimming value.

According to an embodiment, the display device further includes a scan driver that supplies the scan signal to the scan lines, an emission driver that supplies the emission control signal to the emission control lines, and a data driver that supplies a data signal to the data lines.

According to an embodiment, after the scan signal is supplied to the i-th scan line, the emission driver supplies the emission control signal to the k-th emission control line such that the emission control signal overlaps with the scan signal for a partial period.

According to an embodiment, the light emitting element is turned off when the data signal is supplied to the second node.

BRIEF DESCRIPTION OF THE DRAWINGS

The above and other features of the present disclosure will become more apparent by describing in detail embodiments thereof with reference to the accompanying drawings.

DETAILED DESCRIPTION OF THE EMBODIMENTS

Figure 1:
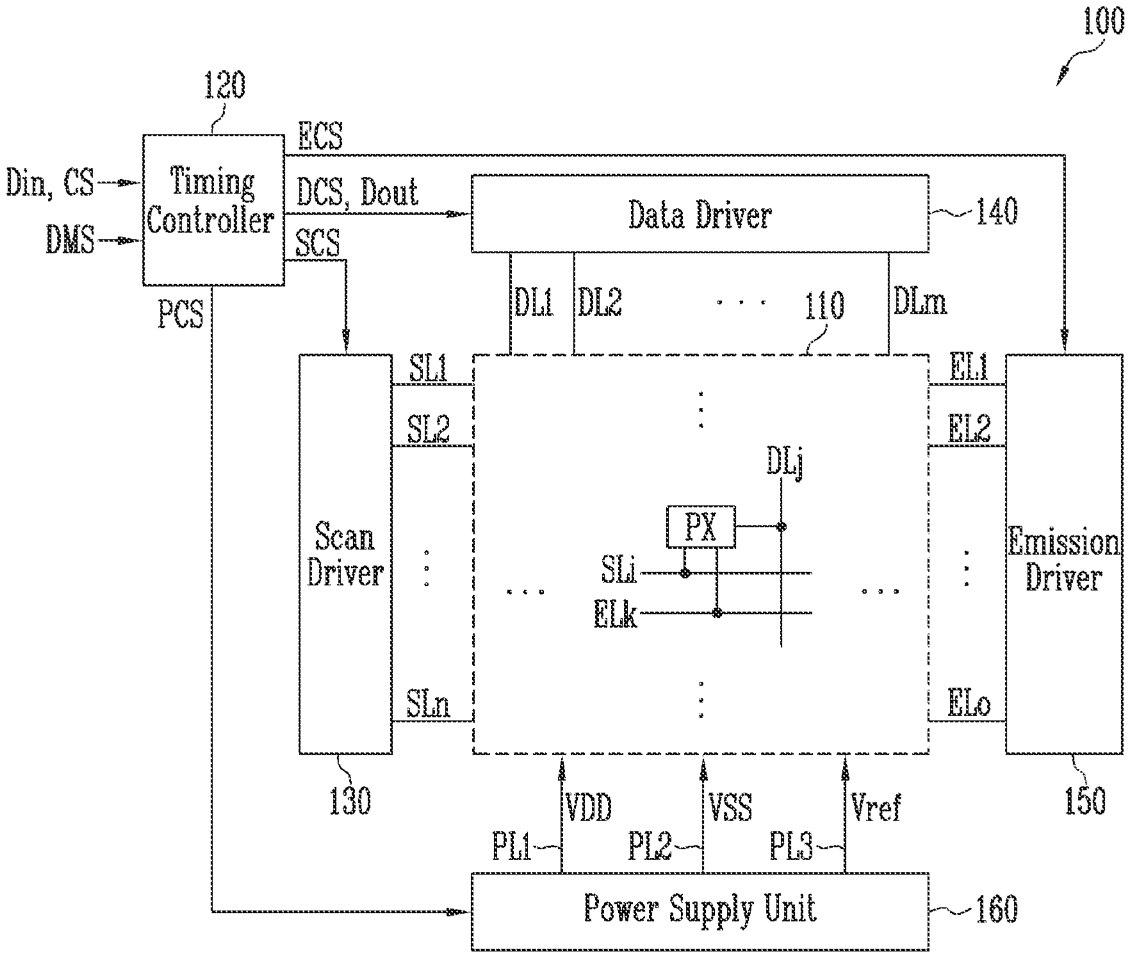
FIG. 1 is a diagram illustrating a display device according to an embodiment of the present disclosure.

Embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

In the description, the expression "is the same" may mean "substantially the same." In other expressions, "substantially" may be omitted.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to exemplary embodiments, the parameter may be exactly the certain value or approximately the certain value within a measurement error as would be understood by a person having ordinary skill in the art. Other uses of these terms and similar terms to describe the relationships between components should be interpreted in a like fashion.

FIG. 1 is a diagram illustrating a display device according to an embodiment of the present disclosure.

Referring to FIG. 1, a display device 100 according to an embodiment of the present disclosure may include a pixel unit 110 (also referred to as a display panel), a timing controller 120, a scan driver 130, a data driver 140, an emission driver 150, and a power supply unit 160. The above-described components may be implemented as separate integrated circuits, and two or more of the above-described components may be implemented to be integrated into a single integrated circuit.

The pixel unit 110 may include pixels PX connected to scan lines SL1, SL2, . . . , and SLn, data lines DL1, DL2, . . . , and DLm, emission control lines EL1, EL2, . . . , and ELo, and power source lines PL1, PL2, and PL3, where n, m, and o are positive integers. As an example, a pixel PXij (refer to FIG. 2) positioned on an i-th horizontal line (or a pixel row) and a j-th vertical line (or a pixel column) may be connected to an i-th scan line SLi and a j-th data line DLj, where i is a positive integer less than or equal to n, and j is a positive integer less than or equal to m.

When a scan signal is supplied to the scan lines SL1 to SLn, pixels PX may be selected in units of horizontal lines (for example, pixels PX connected to the same scan line may be classified as one horizontal line (or pixel row)). The pixels PX selected by the scan signal may receive a data signal from a data line connected thereto (any one of the data lines DL1 to DLm). The pixels PX receiving the data signal may generate light with a predetermined luminance in response to a voltage of the data signal.

The scan driver 130 may receive a scan driving signal SCS from the timing controller 120. The scan driving signal SCS may include a scan start signal and clock signals utilized to drive the scan driver 130. The scan driver 130 may generate the scan signal while shifting the scan start signal in response to a clock signal.

As an example, the scan driver 130 may sequentially supply the scan signal to the scan lines SL1 to SLn. The scan signal may be set to a gate-on voltage to turn on a transistor. As an example, the scan signal of a low level may be supplied to a P-type transistor, and the scan signal of a high level may be supplied to an N-type transistor. A transistor receiving the scan signal may be turned on in response to the scan signal. Hereinafter, the expression that "the scan signal is supplied" may mean that a gate-on voltage is supplied to the scan line SL. The expression that "the scan signal is not supplied" may mean that a gate-off voltage is supplied to the scan line SL.

The data driver 140 may receive output data Dout and a data driving signal DCS from the timing controller 120. The data driving signal DCS may include a sampling signal and/or timing signals utilized to drive the data driver 140. The data driver 140 may generate the data signal based on the data driving signal DCS and the output data Dout. As an example, the data driver 140 may generate an analog data signal based on a gray level of the output data Dout. The data signal generated by the data driver 140 may be supplied to the data lines DL1 to DLm in synchronization with the scan signal.

The emission driver 150 may receive an emission driving signal ECS from the timing controller 120. The emission driving signal ECS may include an emission start signal and clock signals utilized to drive the emission driver 150. The emission driver 150 may generate an emission control signal while shifting the emission start signal in response to a clock signal.

As an example, the emission driver 150 may sequentially supply the emission control signal to the emission control lines EL1 to ELo. The emission control signal may be set to a gate-off voltage to turn off a transistor. As an example, the emission control signal of a high level may be supplied to a P-type transistor, and the emission control signal of a low level may be supplied to an N-type transistor. A transistor receiving the emission control signal may be set to a turned-off state during a period in which the emission control signal is supplied. Hereinafter, the expression that "the emission control signal is supplied" may mean that a gate-off voltage is supplied to the emission control line EL. The expression that "the emission control signal is not supplied" may mean that a gate-on voltage is supplied to the emission control line EL.

The timing controller 120 may receive input data Din and a control signal CS from a host system through an interface. As an example, the timing controller 120 may receive the input data Din and the control signal CS from at least one of a graphics processing unit (GPU), a central processing unit (CPU), and an application processor (AP) included in the host system. The control signal CS may include various signals including a clock signal.

The timing controller 120 may generate the scan driving signal SCS, the data driving signal DCS, the emission driving signal ECS, and a power source driving signal PCS based on the control signal CS. The scan driving signal SCS, the data driving signal DCS, the emission driving signal ECS, and the power source driving signal PCS may be supplied to the scan driver 130, the data driver 140, the emission driver 150, and the power supply unit 160, respectively.

The timing controller 120 may rearrange the input data Din to meet the specifications of the display device 100. The timing controller 120 may correct the input data Din to generate the output data Dout, and supply the output data Dout to the data driver 140. In an embodiment, the timing controller 120 may correct the input data Din in response to an optical measurement result measured during a process.

In an embodiment, the timing controller 120 may receive a dimming signal DMS from the host system (e.g., from outside of the display device 100). The timing controller 120 receiving the dimming signal DMS may control at least one of the scan driving signal SCS, the data driving signal DCS, the emission driving signal ECS, and the power source driving signal PCS based on the dimming signal DMS.

The dimming signal DMS may include a dimming value indicating a maximum display luminance at which the display device 100 (or the pixel unit 110) can emit light. For example, as the dimming value increases, the maximum display luminance that can be displayed by the pixel unit 110 may increase. The maximum display luminance may be a luminance measured when the entire pixel unit 110 emits light with a maximum gray level set in the display device 100.

In an embodiment, the timing controller 120 may adjust an off duty of the emission control signal in response to the dimming signal DMS. For example, the emission driving signal ECS may include the emission start signal, and a gate off period of the emission start signal may be adjusted based on the dimming signal DMS. The emission driver 150 may output the emission control signal having the adjusted off duty (or gate off period) based on the emission start signal. For example, when the dimming value included in the dimming signal DMS decreases (that is, when the maximum display luminance decreases), the gate off period of the emission start signal may increase.

In an embodiment, the timing controller 120 may control the power supply unit 160 to generate a reference power source Vref, which may have different voltages in response to the dimming signal DMS. For example, the timing controller 120 may generate the power source driving signal PCS such that the reference power source Vref is set to a first voltage V1 (refer to FIG. 9) when the data signal is stored in the pixels PX and the reference power source Vref is set to a voltage higher than the first voltage V1 when the pixels PX emit light.

In an embodiment, the timing controller 120 may control a voltage of a second power source VSS in response to a driving method of the display device 100. As an example, the timing controller 120 may generate the power source driving signal PCS so that the second power source VSS maintains a constant voltage when the pixels PX sequentially emit light, that is, when the pixels PX are driven in a sequential driving method. As an example, the timing controller 120 may generate the power source driving signal PCS so that the second power source VSS of a high voltage VSS_H or a low voltage VSS_L (refer to FIG. 10) is generated when the pixels PX simultaneously emit light, that is, when the pixels PX are driven in a simultaneous driving method.

The power supply unit 160 may receive the power source driving signal PCS from the timing controller 120. The power source driving signal PCS may include switch control signals utilized to generate power sources. The power supply unit 160 may generate various power sources utilized to drive the display device 100. As an example, the power supply unit 160 may generate a first power source VDD, the second power source VSS, and the reference power source Vref.

The first power source VDD generated by the power supply unit 160 may be supplied to the first power source line PL1. The first power source line PL1 may be commonly connected to the pixels PX, and may supply a voltage of the first power source VDD to the pixels PX.

The second power source VSS generated by the power supply unit 160 may be supplied to the second power source line PL2. The second power source line PL2 may be commonly connected to the pixels PX and may supply a voltage of the second power source VSS to the pixels PX. The power supply unit 160 may control a voltage value of the second power source VSS in response to the driving method of the display device 100 (that is, in response to the power source driving signal PCS). As an example, the power supply unit 160 may generate the second power source VSS of a constant voltage when the display device 100 is driven in the sequential driving method, and may generate the second power source VSS of the high voltage VSS_H or the low voltage VSS_L when the display device 100 is driven in the simultaneous driving method.

The reference power source Vref generated by the power supply unit 160 may be supplied to a third power source line PL3. The third power source line PL3 may be commonly connected to the pixels PX, and may supply a voltage of the reference power source Vref to the pixels PX. The power supply unit 160 may control a voltage value of the reference power source Vref in response to the dimming value included in the dimming signal DMS (that is, corresponding to the power source driving signal PCS). As an example, when the pixels PX emit light in response to the dimming value included in the dimming signal DMS, the power supply unit 16 may supply the reference power source Vref having any one of a second voltage V2, a third voltage V3, a fourth voltage V4, a fifth voltage V5, and an 1-th voltage V1 (where, 1 is a positive integer equal to or greater than 6) (refer to FIG. 9) to the third power source line PL3. A plurality of voltages may be additionally included between the fifth voltage V5 and the 1-th voltage V1.

The connection relationship between the power source lines PL1, PL2, and PL3 and the pixels PX is not limited thereto. As an example, a plurality of first power source lines PL1 may be connected to different pixels. As an example, a plurality of second power source lines PL2 may be connected to different pixels. As an example, a plurality of third power source lines PL3 may be connected to different pixels.

Figure 2:
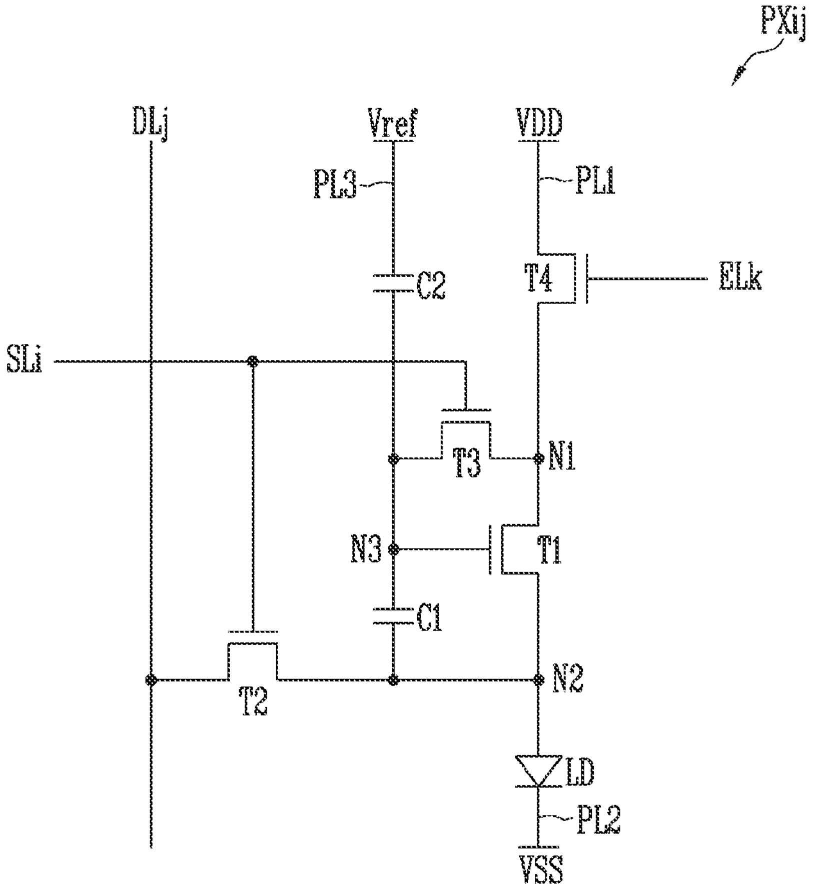
FIG. 2 is a diagram illustrating an embodiment of a pixel shown in FIG. 1.

FIG. 2 is a diagram illustrating an embodiment of a pixel shown in FIG. 1. FIG. 2 shows a pixel positioned on the i-th horizontal line and the j-th vertical line.

Referring to FIG. 2, the pixel PXij may be connected to corresponding signal lines SLi, DLj, and Elk (where, k is a positive integer less than or equal to o). For example, the pixel PXij may be connected to the i-th scan line SLi, the j-th data line DLj, and a k-th emission control line ELk. In an embodiment, the pixel PXij may be further connected to the power source lines PL1, PL2, and PL3. As an example, the pixel PXij may be connected to the first power source line PL1, the second power source line PL2, and the third power source line PL3.

The pixel PXij according to an embodiment of the present disclosure may include a light emitting element LD and a pixel circuit that controls the amount of current supplied to the light emitting element LD.

The light emitting element LD may be connected between the first power source line PL1 and the second power source line PL2. As an example, a first electrode (for example, an anode electrode) of the light emitting element LD may be connected to the first power source line PL1 through a second node N2, a first transistor T1, a first node N1, and a fourth transistor T4, and a second electrode (for example, a cathode electrode) of the light emitting element LD may be connected to the second power source line PL2. The light emitting element LD may generate light having a predetermined luminance in response to a driving current supplied from the first power source line PL1 to the second power source line PL2 via the pixel circuit. To this end, the first power source VDD supplied to the first power source line PL1 may be set to a higher voltage value than the second power source VSS supplied to the second power source line PL2.

In an embodiment, the light emitting element LD may be an organic light emitting diode. In an embodiment, the light emitting element LD may be an inorganic light emitting diode such as, for example, a micro light emitting diode (LED) or a quantum dot light emitting diode. In an embodiment, the light emitting element LD may be an element composed of a combination of an organic material and an inorganic material. FIG. 2 shows the pixel PXij including a single light emitting element LD. However, embodiments are not limited thereto. For example, in an embodiment, the pixel PXij may include a plurality of light emitting elements LD and the plurality of light emitting elements LD may be connected in series, in parallel, or in series and parallel.

The pixel circuit may include the first transistor T1, a second transistor T2, a third transistor T3, the fourth transistor T4, a first capacitor C1, and a second capacitor C2.

In an embodiment, the first to fourth transistors T1 to T4 may be N-type transistors. However, this is only an example, and at least one of the first to fourth transistors T1 to T4 may be replaced with a P-type transistor.

A first electrode of the first transistor T1 (or driving transistor) may be connected to the first node N1, and a second electrode of the first transistor T1 may be connected to the second node N2. That is, the first electrode of the first transistor T1 may be connected to the first power source line PL1 via the first node N1, and the second electrode of the first transistor T1 may be connected to the second power source line PL2 via the second node N2 and the light emitting element LD. A gate electrode of the first transistor T1 may be connected to a third node N3. The first transistor T1 may control the amount of current supplied from the first power source VDD to the second power source VSS via the light emitting element LD in response to a voltage of the third node N3.

The second transistor T2 may be connected between the data line DLj and the second node N2. Also gate electrode of the second transistor T2 may be connected to the scan line SLi. The second transistor T2 may be turned on when the scan signal is supplied to the scan line SLi to electrically connect the data line DLj and the second node N2.

The third transistor T3 may be connected between the first node N1 and the third node N3. Also gate electrode of the third transistor T3 may be connected to the scan line SLi. The third transistor T3 may be turned on when the scan signal is supplied to the scan line SLi to electrically connect the first node N1 and the third node N3. When the third transistor T3 is turned on, the first transistor T1 may be connected in a diode form.

The fourth transistor T4 may be connected between the first power source line PL1 and the first node N1. Also gate electrode of the fourth transistor T4 may be connected to the emission control line ELk. The fourth transistor T4 may be turned off when the emission control signal is supplied to the emission control line ELk, and turned on when the emission control signal is not supplied. When the fourth transistor T4 is turned off, the first power source line PL1 and the first node N1 may be electrically separated, and thus, the light emitting element LD may be set to a non-light emitting state.

The first capacitor C1 may be connected between the second node N2 and the third node N3. The first capacitor C1 may store a voltage corresponding to the data signal and a threshold voltage of the first transistor T1.

The second capacitor C2 may be connected between the third power source line PL3 and the third node N3. The second capacitor C2 may stabilize the voltage of the third node N3.

In an embodiment, the reference power source Vref supplied to the third power source line PL3 may be set as a constant voltage source. For example, the voltage of the reference power source Vref may be set to be equal to the voltage of the first power source VDD. In an embodiment, the reference power source Vref supplied to the third power source line PL3 may be set to have various voltage values in response to the dimming value.

Figure 3:
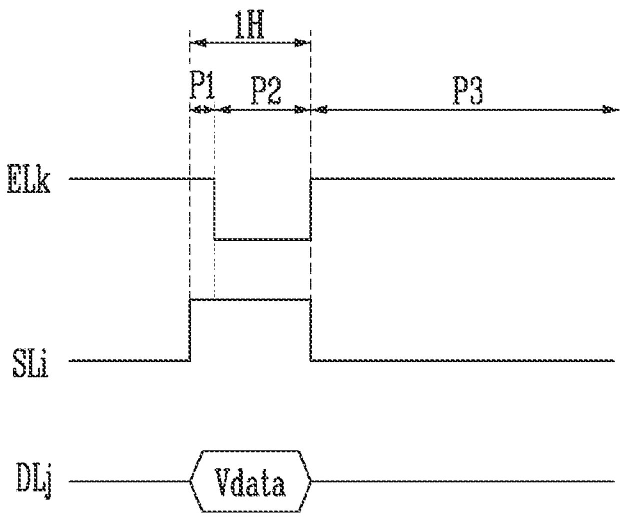
FIG. 3 is a waveform diagram for describing a method of driving a pixel according to an embodiment of the present disclosure.

FIG. 3 is a waveform diagram for describing a method of driving a pixel according to an embodiment of the present disclosure. FIG. 3 shows driving waveforms supplied to the pixel shown in FIG. 2.

Referring to FIG. 3, in an embodiment of the present disclosure, the pixel PXij may be driven in a first period P1, a second period P2, and a third period P3. The first period P1 and the second period P2 may be included in one horizontal period 1H. During the first period P1 and the second period P2, a voltage Vdata of the data signal may be supplied to the data line DLj The first period P1 may be a period for initializing the first capacitor C1 and the second capacitor C2. The first period P1 may be referred to as an initialization period. The second period P2 may be a period in which the threshold voltage of the first transistor T1 is compensated for and a voltage corresponding to the data signal is stored. The second period P2 may be referred to as a data writing and threshold voltage compensating period. The third period P3 may be a period in which the light emitting element LD emits light in response to a voltage stored in the pixel PXij in the second period P2. The third period P3 may be referred to as an emission period.

Figure 4A:
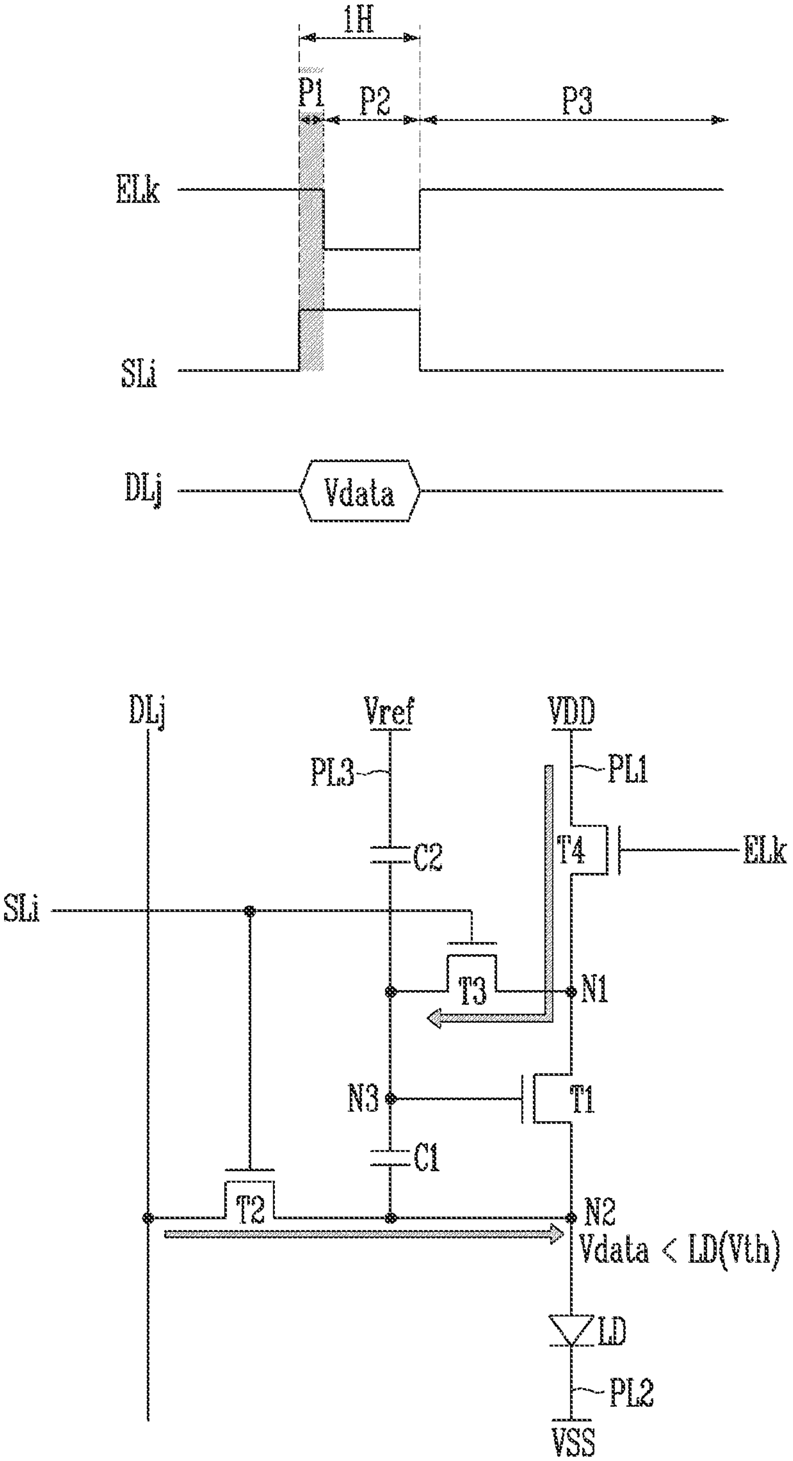
FIGS. 4A to 4C are diagrams for describing a process of operating the pixel in response to driving waveforms of FIG. 3.
Figure 4B:
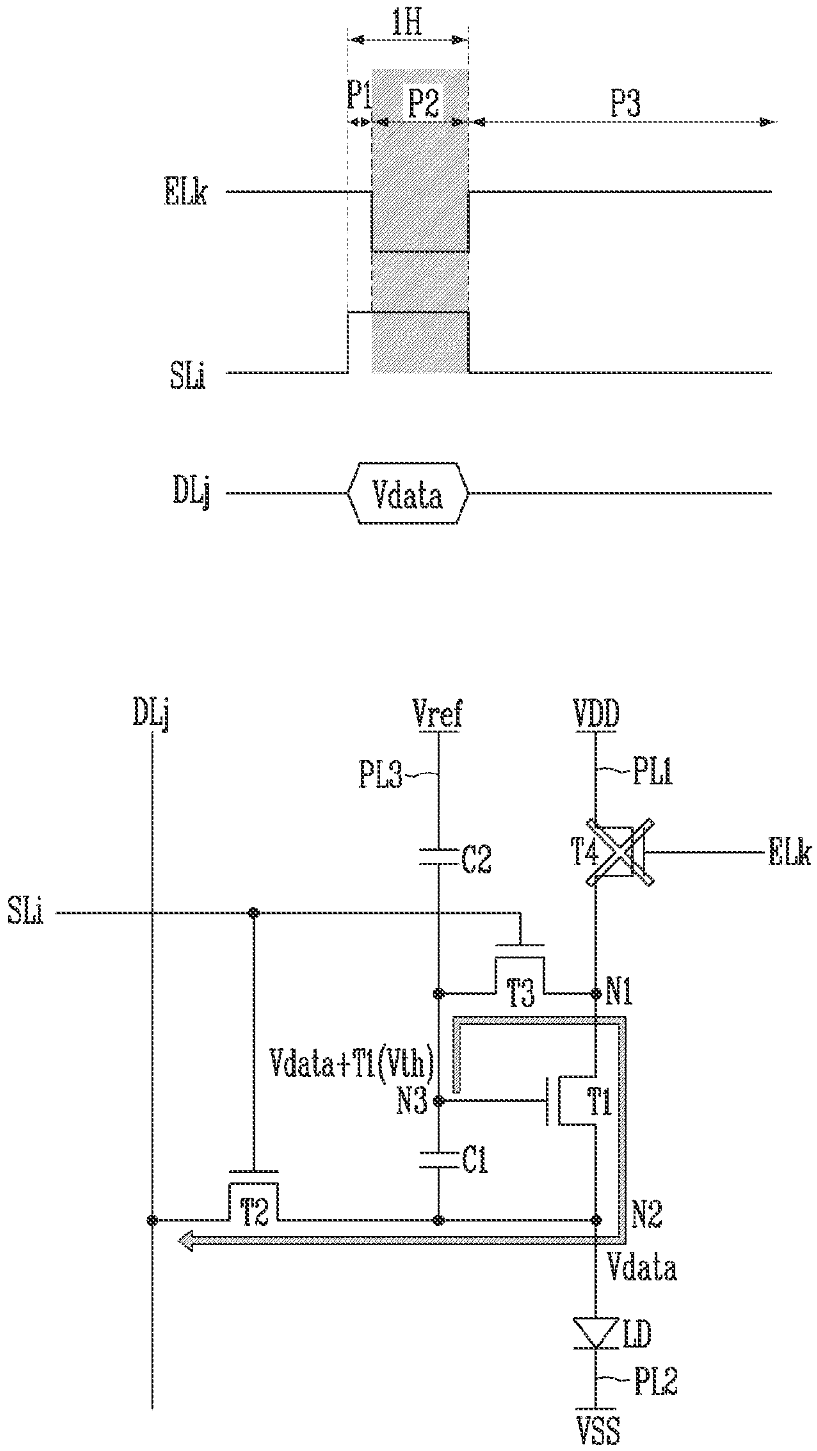
Figure 4C:
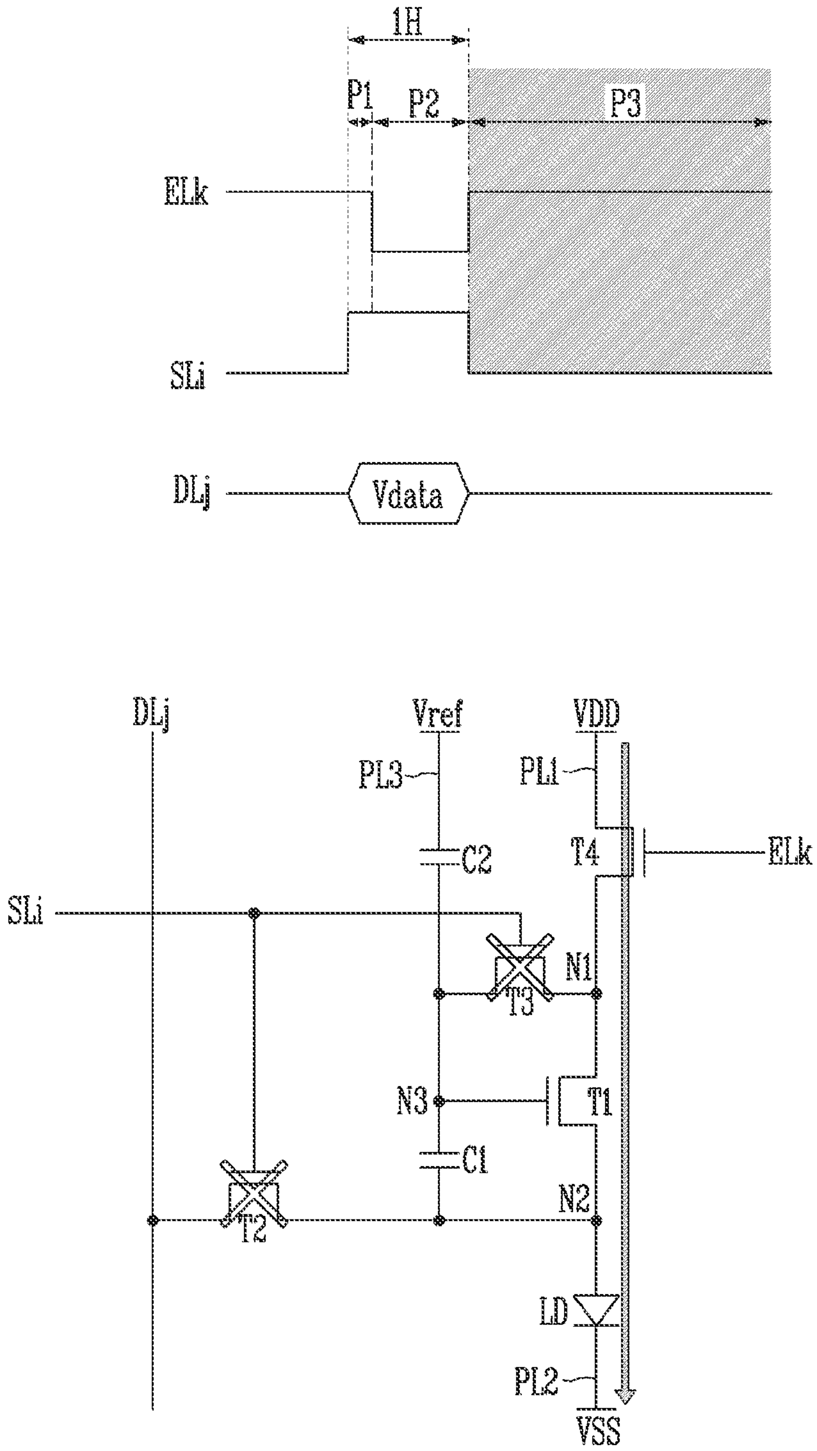

FIGS. 4A to 4C are diagrams for describing a process of operating the pixel in response to driving waveforms of FIG. 3.

Referring to FIG. 4A, during the first period P1 and the second period P2, the voltage Vdata of the data signal may be supplied to the data line DLj. The voltage Vdata of the data signal may be set to various voltages corresponding to gray levels to be expressed.

In an embodiment, during the first period P1, the scan signal may be supplied to the scan line SLi, and the emission control signal is not supplied to the emission control line ELk.

When the scan signal is supplied to the scan line SLi, the second transistor T2 and the third transistor T3 may be turned on. When the second transistor T2 is turned on, the data signal from the data line DLj may be supplied to the second node N2. The voltage Vdata of the data signal may be set such that the light emitting element LD does not emit light (or is turned off). As an example, the voltage Vdata of the data signal may be set to a voltage lower than a threshold voltage LD(Vth) of the light emitting element LD so that the light emitting element LD does not emit light when the voltage Vdata of the data signal is supplied to the anode electrode of the light emitting element LD. Accordingly, during the first period P1, the light emitting element LD may be set to the non-light emitting state.

When the third transistor T3 is turned on, the first node N1 and the third node N3 may be electrically connected to each other. In this case, the first transistor T1 may be connected in a diode form.

When the emission control signal is not supplied to the emission control line ELk, the fourth transistor T4 may be maintained in a turned-on state. When the fourth transistor T4 is turned on, the voltage of the first power source VDD may be supplied to the third node N3 through the first node N1 and the third transistor T3. That is, during the first period P1, the third node N3 may be initialized with the voltage of the first power source VDD.

Referring to FIG. 4B, during the second period P2, the scan signal supplied to the scan line SLi may be maintained. That is, the scan signal may be supplied to the scan line SLi during the first period P1 and the second period P2.

During the second period P2, the emission control signal may be supplied to the emission control line ELk. When the emission control signal is supplied to the emission control line ELk, the fourth transistor T4 may be turned off. When the fourth transistor T4 is turned off, the first power source line PL1 and the first node N1 may be electrically separated.

In this case, since the first transistor T1 is connected in a diode form, the voltage of the first power source VDD applied to the third node N3 in a previous period (that is, the first period P1) may drop to a voltage obtained by adding the voltage Vdata of the data signal and a threshold voltage T1(Vth) of the first transistor T1. To this end, the voltage Vdata of the data signal may be set to a voltage lower than that of the first power source VDD.

During the second period P2, the third node N3 may be set to the voltage obtained by adding the voltage Vdata of the data signal and the threshold voltage T1(Vth) of the first transistor T1 (that is, Vdata+T1(Vth)), and the second node N2 may be set to the voltage Vdata of the data signal. Therefore, during the second period P2, a voltage corresponding to the threshold voltage T1(Vth) of the first transistor T1 may be stored in the first capacitor C1. During the second period P2, a voltage corresponding to the voltage Vdata of the data signal and the threshold voltage T1(Vth) of the first transistor T1 may be stored in the second capacitor C2.

Referring to FIG. 4C, during the third period P3, the supply of the scan signal to the scan line SLi may be stopped, and the supply of the emission control signal to the emission control line ELk may be stopped.

When the supply of the scan signal to the scan line SLi is stopped, the second transistor T2 and the third transistor T3 may be turned off. When the second transistor T2 is turned off, the data line DLj and the second node N2 may be electrically separated. When the third transistor T3 is turned off, the first node N1 and the third node N3 may be electrically separated.

When the supply of the emission control signal to the emission control line ELk is stopped, the fourth transistor T4 may be turned on. When the fourth transistor T4 is turned on, the first node N1 and the first power source line PL1 may be electrically connected to each other. In this case, the first transistor T1 may supply a driving current from the first power source VDD to the second power source VSS via the light emitting element LD in response to the voltage of the third node N3, and the light emitting element LD may generate light having a luminance corresponding to the driving current.

When the driving current is supplied to the light emitting element LD, the voltage of the third node N3 may be set as in Equation 1 below.

$$VN3 = Vdata + T1(Vth) + \alpha(VN2 - Vdata) \quad \text{[Equation 1]}$$

In Equation 1, Vdata refers to the voltage of the data signal, T1(Vth) refers to the threshold voltage of the first transistor, a refers to C1/(C1+C2), and VN2 refers to a voltage of the second node N2 (that is, a voltage of the second node N2 corresponding to the driving current) in the third period P3.

During the third period P3, the voltage of the second node N2 may change from the voltage Vdata of the data signal to a predetermined voltage in response to the driving current. In this case, a voltage of the first node N1 may change in response to the amount of change in the voltage of the second node N2 due to the coupling of the first capacitor C1. Accordingly, during the third period P3, the voltage of Equation 1 may be applied to the third node N3.

When the voltage of Equation 1 is applied to the third node N3, the driving current flowing to the light emitting element LD may be set as Equation 2 below.

$$Ild \doteq (1 - \alpha)(Vdata - VN2) \quad \text{[Equation 2]}$$

In Equation 2, Ild refers to the driving current supplied to the light emitting element LD.

Referring to Equation 2, the driving current supplied to the light emitting element LD may be determined regardless of the threshold voltage of the first transistor T1. That is, the pixel PXij of embodiments of the present disclosure may include four transistors T1 to T4 and two capacitors C1 and C2, and may control the driving current supplied to the light emitting element LD regardless of the threshold voltage of the first transistor T1.

In addition, since the pixel PXij of embodiments of the present disclosure includes four transistors T1 to T4 and two capacitors C1 and C2, that is, has a relatively simple structure, the pixel PXij can be applied to the display device 100 having a high resolution.

Figure 5:
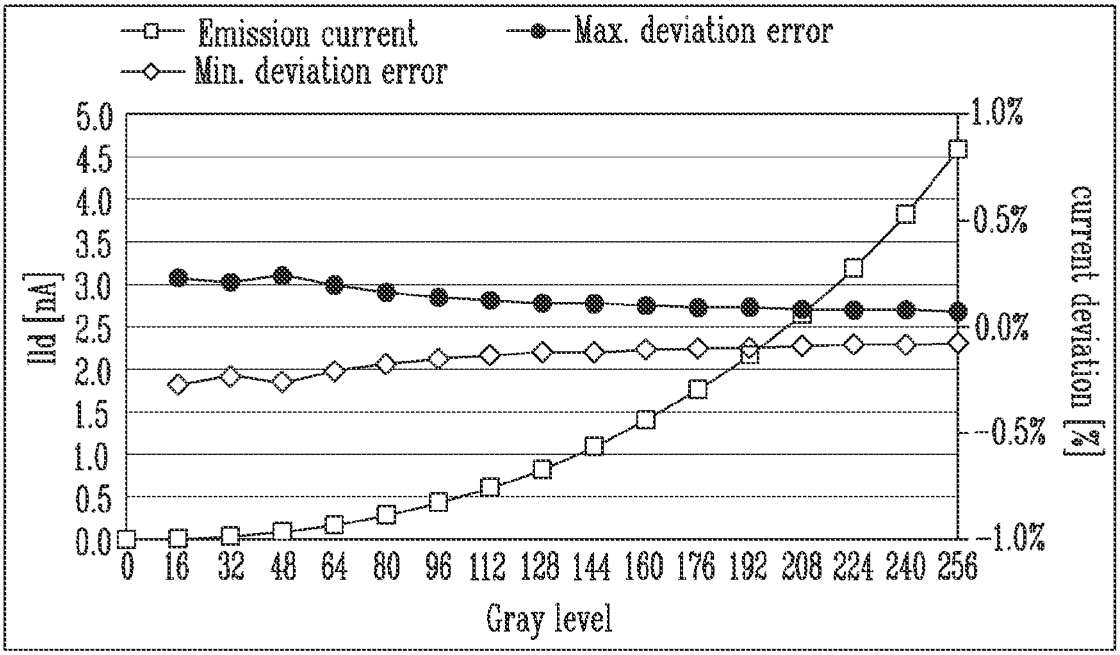
FIG. 5 is a graph illustrating driving current and current deviation corresponding to the pixel shown in FIG. 2.

FIG. 5 is a graph illustrating driving current and current deviation corresponding to the pixel shown in FIG. 2. In FIG. 5, the X-axis represents a gray level, the left Y-axis represents the driving current Ild supplied to the light emitting element LD, and the right Y-axis represents the current deviation.

Referring to FIG. 5, when the gray level is changed from 0 gray level (0 Gray) to 256 gray level (256 Gray), the driving current Ild may be changed from about 0.0 nA to about 4.6 nA. That is, in the pixel according to an embodiment of the present disclosure, the driving current Ild may be changed in response to the gray level. Accordingly, the pixel may stably generate light having a luminance corresponding to the gray level.

When the gray level is changed from 0 gray level to 256 gray level, the current deviation may be set to ±0.3%. That is, the pixel according to an embodiment of the present disclosure may implement a desired gray level while minimizing or reducing the current deviation. The current deviation represents an error rate of current as a percentage (%).

Figure 6:
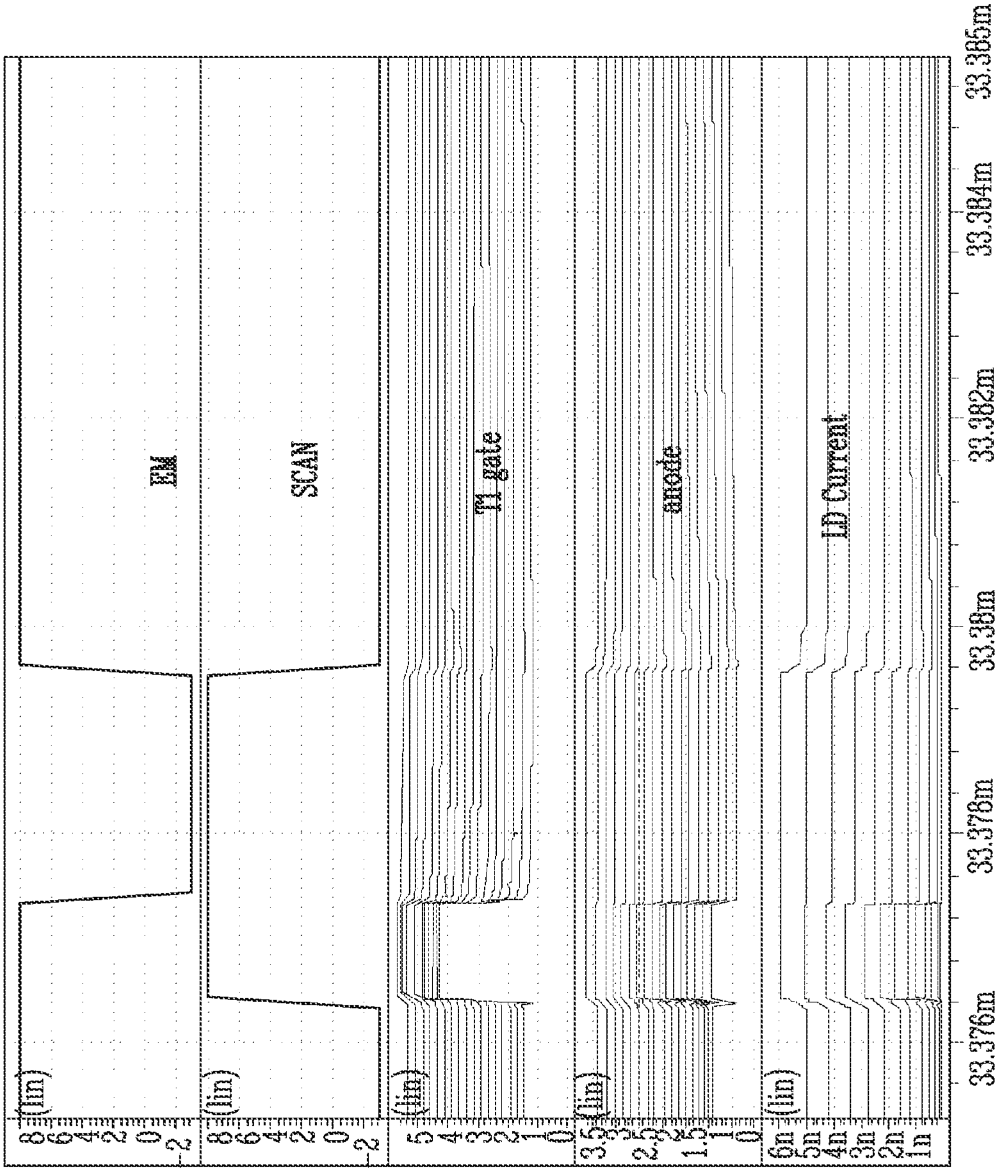
FIG. 6 is a graph illustrating simulation results corresponding to the pixel shown in FIG. 2.

FIG. 6 is a graph illustrating simulation results corresponding to the pixel shown in FIG. 2. In FIG. 6, EM represents the emission control signal, SCAN represents the scan signal, T1 gate represents the voltage of the third node N3 corresponding to a gray level (for example, 0 Gray to 256 Gray), anode represents the voltage of the second node N2, and LD current represents the driving current Ild supplied to the light emitting element LD.

In addition, in FIG. 6, the X-axis represents time, the Y-axis of LD current represents current (for example, nA), and the Y-axis of EM, SCAN, T1 gate, and anode represents voltage.

Referring to FIG. 6, different voltages may be applied to the third node N3 (that is, T1 gate) corresponding to various gray levels. Correspondingly, it can be confirmed that different driving currents Ild are supplied.

Figure 7:
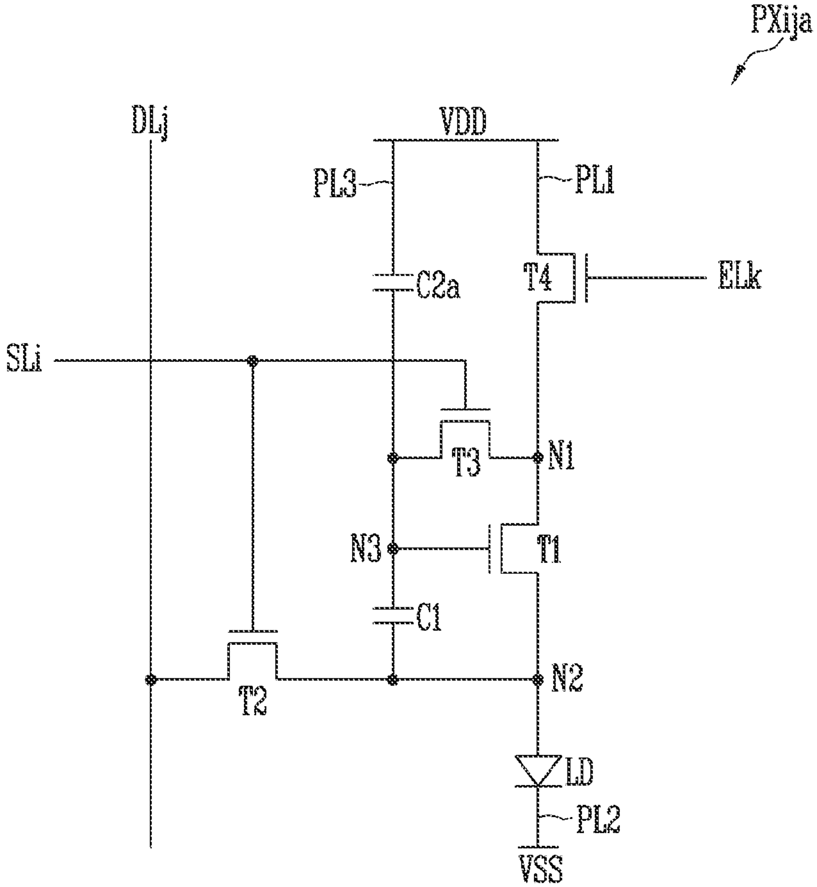
FIG. 7 is a diagram illustrating a pixel according to an embodiment of the present disclosure.

FIG. 7 is a diagram illustrating a pixel according to an embodiment of the present disclosure. In describing FIG. 7, for convenience of explanation, a further description of components and technical aspects previously described with reference to FIG. 2 will be omitted.

Referring to FIG. 7, a pixel PXija according to an embodiment of the present disclosure may include a light emitting element LD and a pixel circuit.

The pixel circuit may include a first transistor T1, a second transistor T2, a third transistor T3, a fourth transistor T4, a first capacitor C1, and a second capacitor C2*a*.

The second capacitor C2*a* may be connected between a third power source line PL3 and a third node N3. The third power source line PL3 may be electrically connected to the first power source line PL1. Accordingly, the third power source line PL3 may receive the voltage of the first power source VDD. In this case, the third power source line PL3 that supplies the reference power source Vref may be replaced with the first power source line PL1. In addition, in an embodiment, when the pixel PXija of FIG. 7 is included in the pixel unit 110, the power supply unit 160 does not generate the reference power source Vref. Accordingly, the configuration of the power supply unit 160 can be simplified.

Figure 8:
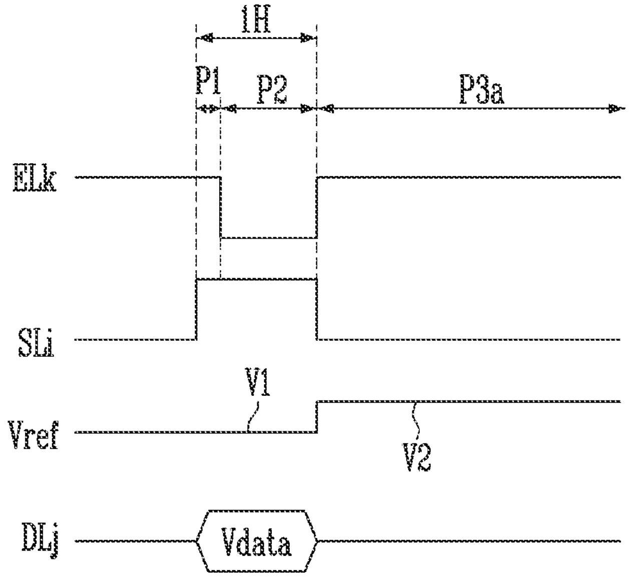
FIG. 8 is a diagram illustrating an embodiment of a driving method corresponding to the pixel shown in FIG. 2.

FIG. 8 is a diagram illustrating an embodiment of a driving method corresponding to the pixel shown in FIG. 2. In describing FIG. 8, for convenience of explanation, a further description of components and technical aspects previously described with reference to FIGS. 3 to 4C will be omitted.

Referring to FIGS. 2 and 8, during a first period P1 and a second period P2 in which the data signal is supplied to the pixel PXij, the reference power source Vref may be set to a first voltage V1. During a third period P3*a* in which the pixel PXij emits light, the reference power source Vref may be set to a second voltage V2 different from the first voltage V1.

The second voltage V2 may be set to a higher voltage than the first voltage V1. During the third period P3, when the reference power source Vref is increased from the first voltage V1 to the second voltage V2, the voltage of the third node N3 may also be increased due to the coupling of the second capacitor C2. When the voltage of the third node N3 increases, the amount of driving current Ild supplied from the first transistor T1 to the light emitting element LD may increase. Accordingly, the luminance of the pixel PXij can be increased.

That is, in an embodiment of the present disclosure, even if the voltage Vdata of the data signal is set low, the voltage of the third node N3 can be increased using the reference power source Vref.

Figure 9:
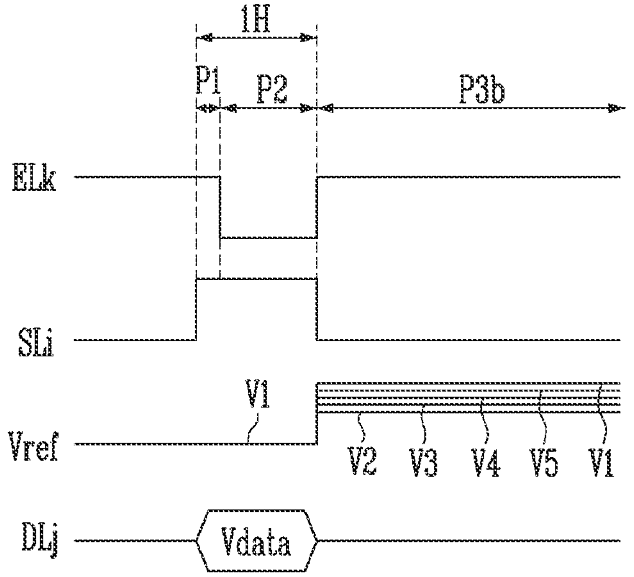
FIG. 9 is a diagram illustrating an embodiment of a driving method corresponding to the pixel shown in FIG. 2.

FIG. 9 is a diagram illustrating an embodiment of a driving method corresponding to the pixel shown in FIG. 2.

Referring to FIGS. 1, 2, and 9, during a first period P1 and a second period P2 in which the data signal is supplied to the pixel PXij, the reference power source Vref may be set to a first voltage V1. During a third period P3_b_ in which the pixel PXij emits light, the reference power source Vref may be set to any one of a second voltage V2, a third voltage V3, a fourth voltage V4, a fifth voltage V5, and an 1-th voltage V1 different from the first voltage V1. The voltage (for example, one of V2 to V1) of the reference power source Vref supplied during the third period P3_b_ may be controlled by the dimming value included in the dimming signal DMS.

In an embodiment, the timing controller 120 may generate the power source driving signal PCS in response to the dimming value included in the dimming signal DMS. The timing controller 120 may generate the power source driving signal PCS so that a higher voltage (for example, any one of V2 to V1) of the reference power source Vref is supplied during the third period P3_b_ as the dimming value increases (that is, as the maximum display luminance of the pixel unit 110 increases).

The power supply unit 160 receiving the power source driving signal PCS may generate a voltage (for example, any one of V2 to V1) of the reference power source Vref to be supplied during the third period P3_b_, and supply the generated voltage of the reference power source Vref to the third power source line PL3. That is, in an embodiment of the present disclosure, the width at which the voltage of the reference power source Vref is increased may be controlled in response to the dimming value. In this case, the luminance of the pixel unit 110 can be stably controlled in response to the dimming value.

Additionally, in FIG. 9, during the third period P3_b_, any one of the second voltage V2 to the 1-th voltage V1 is supplied as the voltage of the reference power source Vref. However, embodiments of the present disclosure are not limited thereto. As an example, the power supply unit 160 (or the timing controller 120) may supply at least two or more different voltages during the third period P3_b_ in response to the dimming value according to an embodiment.

In the above description, an embodiment in which any one of the second voltage V2 to the 1-th voltage V1 is supplied during the third period P3_b_ has been described as an example. However, embodiments of the present disclosure are not limited thereto. As an example, during the third period P3_b_, the second voltage V2 may be supplied, and a voltage value of the second voltage V2 may be changed in response to the dimming value according to an embodiment. That is, when the dimming value increases, the voltage value of the second voltage V2 supplied during the third period P3_b_ may also increase. In this case, the second voltage V2 to the 1-th voltage V1 shown in FIG. 9 may all be assumed to be the second voltage V2, and it may be understood that the voltage value of the second voltage V2 is differently set to correspond to the dimming value.

Figure 10:
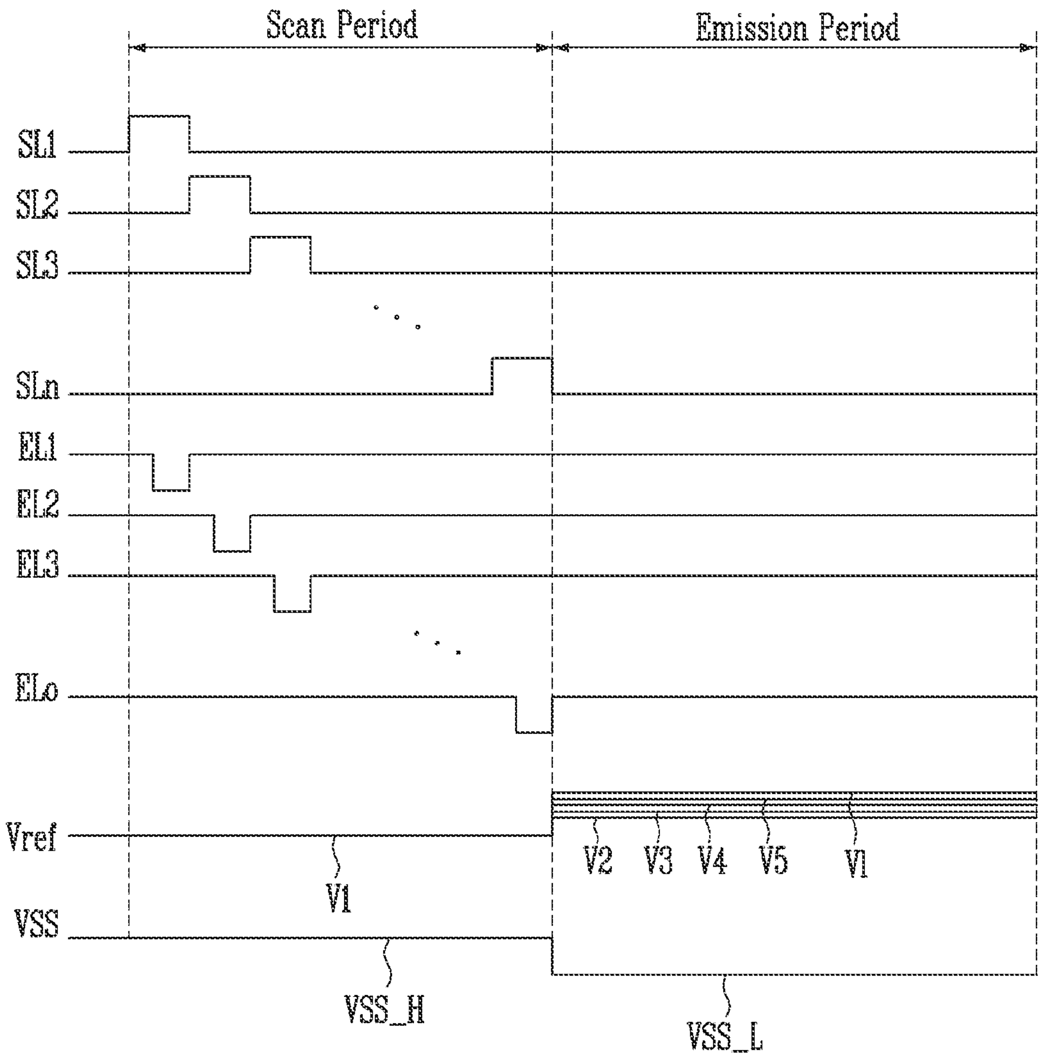
FIG. 10 is a diagram illustrating an embodiment of driving waveforms supplied to pixels when the display device is driven in a simultaneous driving method.

FIG. 10 is a diagram illustrating an embodiment of driving waveforms supplied to pixels when the display device is driven in a simultaneous driving method.

Referring to FIGS. 1, 2, and 10, in the simultaneous driving method, one frame may be driven by being divided into a scan period and an emission period.

The scan period may be a period during which the voltage Vdata of the data signal is supplied to the pixels PX. During the scan period, the scan driver 130 may sequentially supply the scan signal to the scan lines SL1 to SLn, and the data driver 140 may supply the data signal to the data lines DL1 to DLm in synchronization with the scan signal.

During the scan period, in response to the power driving signal PCS, the power supply unit 160 may supply the second power source VSS_H of a high voltage to the second power source line PL2 and supply the reference power source Vref of the first voltage V1 to the third power source line PL3.

The second power source VSS_H of the high voltage may be set so that the light emitting element LD included in each of the pixels PX does not emit light. Therefore, during the scan period, the pixels PX may be set to the non-light emitting state. During the scan period, the reference power source Vref may be set to the first voltage V1. Accordingly, the pixels PX may store a voltage corresponding to the reference power source Vref of the first voltage V1 and the data signal.

The emission period may be a period in which the pixels PX simultaneously emit light. During the emission period, in response to the power driving signal PCS, the power supply unit 160 may supply the reference power source Vref having any one of the second voltage V2 to the 1-th voltage V to the third power source line PL3. During the emission period, a voltage supplied as the reference power source Vref may be determined in response to the dimming value.

During the emission period, when the reference power source Vref having any one of the second voltage V2 to the 1-th voltage V1 is supplied, the voltage of the third node N3 included in each of the pixels PX may increase. Accordingly, the luminance of the pixels PX can be increased.

During the emission period, the power supply unit 160 may supply the second power source VSS_L of a low voltage to the second power source line PL2 in response to the power driving signal PCS. The second power source VSS_L of the low voltage may be set to a lower voltage than the first power source VDD. For example, a voltage value of the second power source VSS_L may be set so that the light emitting element LD included in each of the pixels PX emits light. When the second power source VSS_L of the low voltage is supplied, the pixels PX may simultaneously emit light in response to the voltage of the data signal stored in the scan period.

In the driving waveforms of FIG. 10 described above, during the emission period, the voltage value of the reference power source Vref may be controlled in response to the dimming value. Accordingly, the luminance of the pixel unit 110 can be stably controlled in response to the dimming value.

Figure 11:
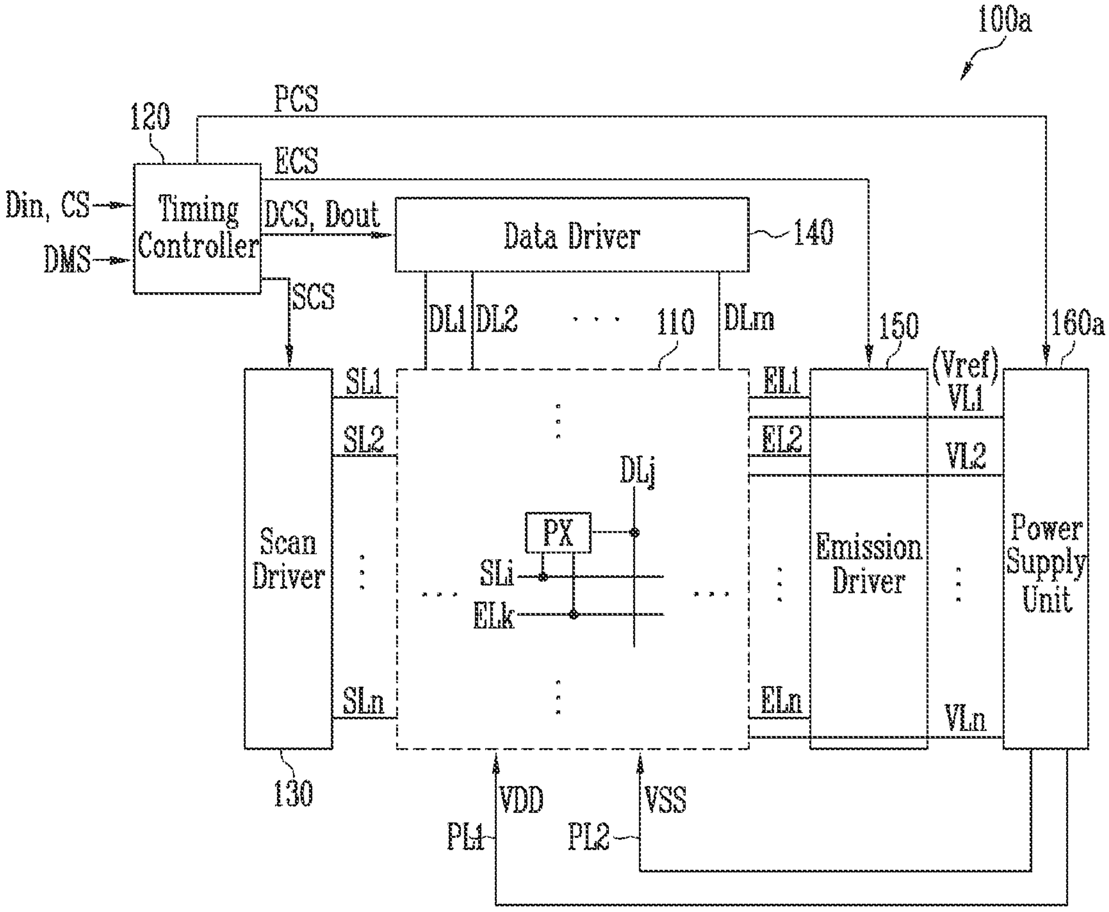
FIG. 11 is a diagram illustrating a display device according to an embodiment of the present disclosure.
Figure 12:
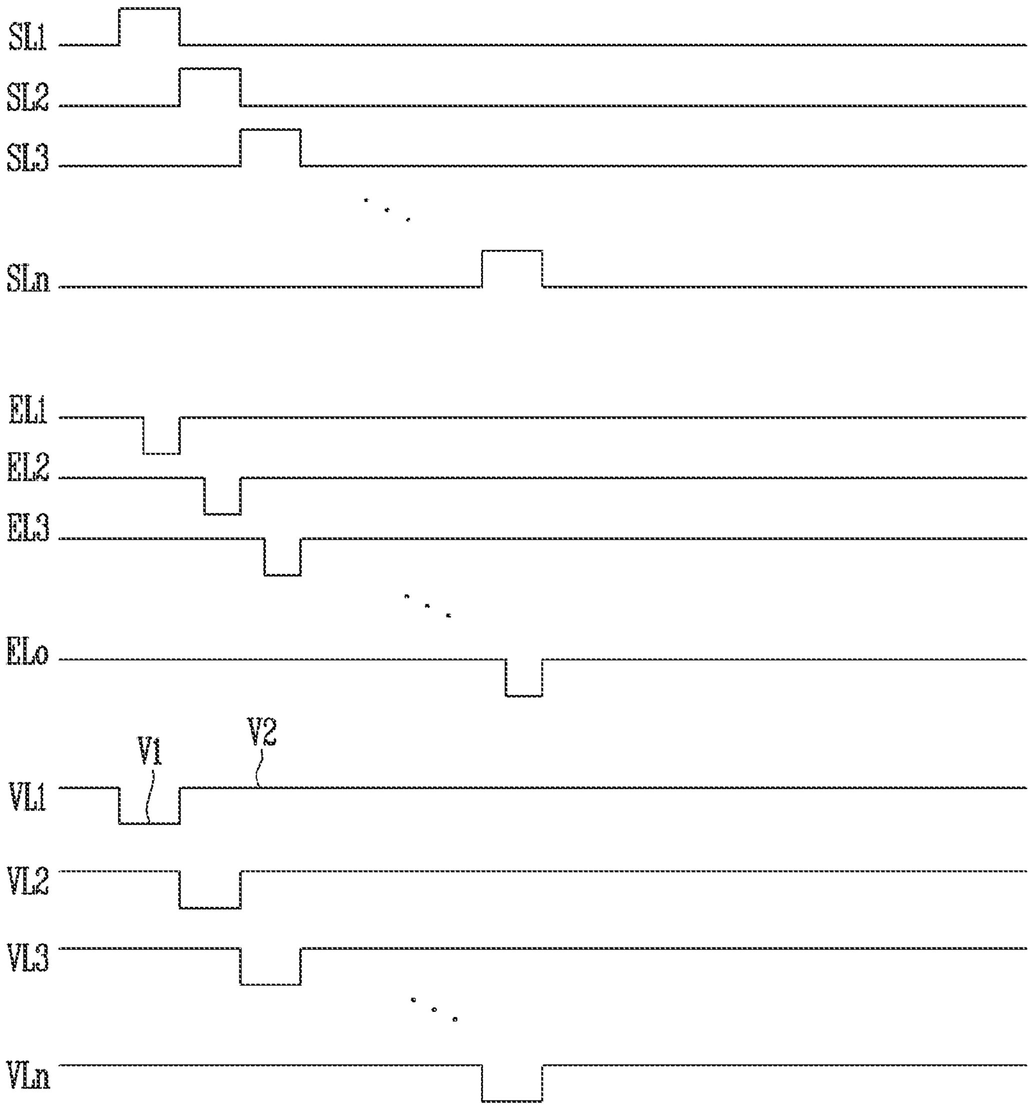
FIG. 12 is a diagram illustrating an embodiment of driving waveforms supplied to pixels when the display device of FIG. 11 is driven in a sequential driving method.

FIG. 11 is a diagram illustrating a display device according to an embodiment of the present disclosure. FIG. 12 is a diagram illustrating an embodiment of driving waveforms supplied to pixels when the display device of FIG. 11 is driven in a sequential driving method. FIG. 12 shows waveforms in a case in which the emission control lines are formed for each horizontal line as an example.

Referring to FIG. 11, a display device 100_a_ according to an embodiment of the present disclosure may include a pixel unit 110, a timing controller 120, a scan driver 130, a data driver 140, an emission driver 150, and a power supply unit 160_a_.

The power supply unit 160_a_ may receive a power driving signal PCS from the timing controller 120. The power driving signal PCS may include switch control signals utilized to generate power sources. The power supply unit 160_a_ may generate various power sources utilized to drive the display device 100_a_ in response to the power driving signal PCS. As an example, the power supply unit 160_a_ may generate a first power source VDD, a second power source VSS, and a reference power source Vref.

The first power source VDD generated by the power supply unit 160_a_ may be supplied to a first power source line PL1. The first power source line PL1 may be commonly connected to the pixels PX, and a voltage of the first power source VDD may be supplied to the pixels PX.

The second power source VSS generated by the power supply unit 160*a* may be supplied to a second power source line PL2. The second power line PL2 may be commonly connected to the pixels PX and a voltage of the second power source VSS may be supplied to the pixels PX. The power supply unit 160*a* may supply the second power source VSS of a constant voltage in response to the sequential driving method. The second power source VSS may be set to a lower voltage than the first power source VDD.

The reference power source Vref generated by the power supply unit 160*a* may be supplied to a third power source line PL3. The third power source line PL3 may include power source control lines VL1, VL2, . . . , and VLn positioned on each horizontal line.

The first power source control line VL1 may be positioned on a first horizontal line and may be electrically connected to pixels positioned on the first horizontal line. The second power source control line VL2 may be positioned on a second horizontal line and may be electrically connected to pixels positioned on the second horizontal line. The n-th power source control line VLn may be positioned on an n-th horizontal line and may be electrically connected to pixels positioned on the n-th horizontal line.

The power supply unit 160*a* may sequentially supply a first voltage V1 in synchronization with the scan signal. As an example, when the scan signal is supplied to a first scan line SL1, the reference power source Vref supplied to the first power source control line VL1 may be set to the first voltage V1. After the supply of the scan signal to the first scan line SL1 is stopped, the reference power source Vref supplied to the first power source control line VL1 may be set to a second voltage V2.

As described above, the second voltage V2 may be set to a higher voltage than the first voltage V1. Accordingly, the luminance of the pixel can be increased. Additionally, as described above, the reference power source Vref may be increased to any one of the second voltage V2 to the 1-th voltage V1 in response to the dimming value.

The power supply unit 160*a* may sequentially supply the first voltage V1 to the first power source control line VL1 to the n-th power source control line VLn in synchronization with the scan signal sequentially supplied. During a period other than the period in which the first voltage V1 is supplied, the power supply unit 160*a* may supply the second voltage V2 higher than the first voltage V1.

As described above, the pixel according to embodiments of the present disclosure may stably compensate for a threshold voltage of the driving transistor (that is, the first transistor T1) while including a relatively simple circuit structure. Accordingly, the pixel may be applied to high-resolution display devices 100 or 100*a*.

The pixel according to embodiments of the present disclosure may control the voltage of the reference power source Vref in response to the dimming value. Accordingly, the luminance of the pixel unit 110 can be stably controlled. In addition, the pixel according to embodiments of the present disclosure may be variously applied to the sequential driving method, the simultaneous driving method, or the like.

The pixel according to embodiments of the present disclosure may compensate for the threshold voltage of the driving transistor using four transistors and two capacitors. Accordingly, the pixel may be applied to a high-resolution display device.

In addition, according to the pixel of embodiments of the present disclosure and the display device including the same, the voltage of the reference power source supplied to the pixel may be controlled in response to a dimming level. Accordingly, the luminance of the pixel unit can be stably controlled in response to the dimming level.

However, effects of the present disclosure are not limited to the above-described effects.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A pixel, comprising:

a light emitting element;

a first transistor comprising a first electrode connected to a first power source line via a first node, a second electrode connected to a second power source line via a second node and the light emitting element, and a gate electrode connected to a third node;

a second transistor connected between a data line and the second node, and having a gate electrode connected to a scan line;

a third transistor connected between the first node and the third node and having a gate electrode connected to the scan line;

a fourth transistor connected between the first power source line and the first node, and having a gate electrode connected to an emission control line;

a first capacitor connected between the second node and the third node; and a second capacitor connected between a third power source line and the third node.

2. The pixel of claim 1, wherein during a first period of one horizontal period, the second, third, and fourth transistors are set to a turned-on state, and wherein during a second period excluding the first period of the one horizontal period, the fourth transistor is set to a turned-off state.

3. The pixel of claim 1, wherein the first power source line and the third power source line are electrically connected to each other.

4. A display device, comprising:

a plurality of pixels connected to a plurality of scan lines, a plurality of data lines, and a plurality of emission control lines; and a power supply unit that supplies a voltage of a first power source to a first power source line, a voltage of a second power source to a second power source line, and a voltage of a reference power source to a third power source line, wherein a pixel among the plurality of pixels positioned on an i-th horizontal line and a j-th vertical line, wherein each of i and j is a positive integer, comprises:

a light emitting element;

a first transistor comprising a first electrode connected to the first power source line via a first node, a second electrode connected to the second power source line via a second node and the light emitting element, and a gate electrode connected to a third node;

a second transistor connected between a j-th data line among the plurality of data lines and the second node and turned on when a scan signal is supplied to an i-th scan line among the plurality of scan lines;

a third transistor connected between the first node and the third node and turned on when the scan signal is supplied to the i-th scan line;

a fourth transistor connected between the first power source line and the first node and turned off when an emission control signal is supplied to a k-th emission control line among the plurality of emission control lines, wherein k is a positive integer;

a first capacitor connected between the second node and the third node; and a second capacitor connected between the third power source line and the third node.

5. The display device of claim 4, wherein the power supply unit supplies the reference power source as a constant voltage to the pixels.

6. The display device of claim 4, wherein the first power source line and the third power source line are electrically connected to each other, and the reference power source is set to a same voltage as the first power source.

7. The display device of claim 4, wherein the power supply unit supplies a first voltage as the voltage of the reference power source to the third power source line when the scan signal is supplied, and supplies a second voltage different from the first voltage as the voltage of the reference power source to the third power source line after supply of the scan signal is stopped.

8. The display device of claim 7, wherein the second voltage is a higher voltage value than the first voltage.

9. The display device of claim 7, wherein one frame period is driven by being divided into a scan period in which the pixels do not emit light and an emission period in which the pixels emit light, wherein the power supply unit supplies the reference power source of the first voltage to the third power source line during the scan period and supplies the reference power source of the second voltage to the third power source line during the emission period, and wherein the power supply unit supplies the second power source of a high voltage during the scan period and supplies the second power source of a low voltage, relative to the high voltage, during the emission period.

10. The display device of claim 9, wherein the high voltage of the second power source causes the pixels not to emit light, and the low voltage of the second power source causes the pixels to emit light.

11. The display device of claim 7, wherein the third power source line comprises a plurality of power source control lines electrically connected to the pixels in units of horizontal lines.

12. The display device of claim 11, wherein the power supply unit sequentially supplies the reference power source of the first voltage to the plurality of power source control lines.

13. The display device of claim 7, further comprising:

a timing controller that controls the power supply unit in response to a dimming value included in a dimming signal supplied from outside of the display device.

14. The display device of claim 13, wherein the power supply unit changes a voltage value of the second voltage in response to an increase in the dimming value.

15. The display device of claim 14, wherein when a maximum display luminance of the display device increases in response to the increase in the dimming value, the voltage value of the second voltage increases in response to the increase in the dimming value.

16. The display device of claim 4, further comprising:

a scan driver that supplies the scan signal to the scan lines;

an emission driver that supplies the emission control signal to the emission control lines; and a data driver that supplies a data signal to the data lines.

17. The display device of claim 16, wherein after the scan signal is supplied to the i-th scan line, the emission driver supplies the emission control signal to the k-th emission control line such that the emission control signal overlaps with the scan signal for a partial period.

18. The display device of claim 16, wherein the light emitting element is turned off when the data signal is supplied to the second node.

* * * * *